(12) United States Patent
Darrah et al.

(10) Patent No.: US 12,716,336 B2
(45) Date of Patent: Aug. 25, 2026

(54) SYSTEMS AND METHODS FOR GENERATION OF HYDROGEN BY IN-SITU (SUBSURFACE) SERPENTINIZATION AND CARBONIZATION OF MAFIC OR ULTRAMAFIC ROCK

(71) Applicant: Ohio State Innovation Foundation, Columbus, OH (US)

(72) Inventors: Thomas Darrah, Westerville, OH (US); Vikram Rao, Chapel Hill, NC (US); Colin Whyte, Grove City, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 18/302,708

(22) Filed: Apr. 18, 2023

(65) Prior Publication Data

US 2023/0272698 A1 Aug. 31, 2023

Related U.S. Application Data

(63) Continuation of application No. 17/815,903, filed on Jul. 28, 2022, now abandoned.

(60) Provisional application No. 63/203,815, filed on Jul. 30, 2021.

(51) Int. Cl.

| | |
|---|---|
| ***E21B 43/16*** | (2006.01) |
| ***C09K 8/70*** | (2006.01) |
| ***C09K 8/72*** | (2006.01) |
| ***E21B 41/00*** | (2006.01) |
| ***E21B 43/26*** | (2006.01) |

(Continued)

(52) U.S. Cl.
CPC .............. *E21B 43/164* (2013.01); *C09K 8/70* (2013.01); *C09K 8/72* (2013.01); *E21B 41/0064* (2013.01); *E21B 43/26* (2013.01); *E21B 43/281* (2013.01); *E21B 43/35* (2020.05)

(58) Field of Classification Search
None
See application file for complete search history.

(56) References Cited

U.S. PATENT DOCUMENTS

| | | | |
|---|---|---|---|
| 4,078,904 | A | 3/1978 | Galt et al. |
| 4,382,912 | A | 5/1983 | Madgavkar et al. |
| 7,426,959 | B2 | 9/2008 | Wang et al. |

(Continued)

FOREIGN PATENT DOCUMENTS

| | | | |
|---|---|---|---|
| CA | 2832461 | A1 | 4/2014 |
| CN | 214221410 | U | 9/2021 |

(Continued)

OTHER PUBLICATIONS

JP S63500864 A Mar. 31, 1988 (Year: 1988).*

(Continued)

*Primary Examiner* — Silvana C Runyan
(74) *Attorney, Agent, or Firm* — K&L Gates LLP

(57) ABSTRACT

Apparatuses, systems, and methods are disclosed for producing and liberating hydrogen gas and sequestering carbon dioxide through sequential serpentinization and carbonation (mineralization) reactions conducted in situ via one or more wellbores that at least partially traverse subterranean geological formations having large concentrations of mafic igneous rock, ultramafic igneous rock, or a combination thereof.

13 Claims, 6 Drawing Sheets

(51) Int. Cl.
*E21B 43/28* (2006.01)
*E21B 43/34* (2006.01)

(56) References Cited

U.S. PATENT DOCUMENTS

| | | | | |
|---|---|---|---|---|
| 8,136,592 | B2 | 3/2012 | Hsu et al. | |
| 2003/0010652 | A1 | 1/2003 | Hunt | |
| 2004/0146288 | A1 | 7/2004 | Vinegar et al. | |
| 2006/0185985 | A1 | 8/2006 | Jones | |
| 2007/0298479 | A1 | 12/2007 | Larter et al. | |
| 2008/0216774 | A1 | 9/2008 | Fulton et al. | |
| 2009/0056941 | A1 | 3/2009 | Valdez | |
| 2011/0146982 | A1 | 6/2011 | Kaminsky | |
| 2011/0220351 | A1 | 9/2011 | Surguchev et al. | |
| 2012/0134749 | A1 | 5/2012 | Darrah | |
| 2013/0020073 | A1* | 1/2013 | Head | C12N 1/38 166/246 |
| 2013/0113480 | A1 | 5/2013 | Kadayam et al. | |
| 2013/0233057 | A1 | 9/2013 | Karoum et al. | |
| 2014/0027119 | A1 | 1/2014 | De et al. | |
| 2014/0114576 | A1 | 4/2014 | Jain et al. | |
| 2014/0190691 | A1 | 7/2014 | Vinegar et al. | |
| 2015/0361833 | A1 | 12/2015 | Hinders et al. | |
| 2016/0186548 | A1 | 6/2016 | Pantano | |
| 2016/0298437 | A1* | 10/2016 | Mendell | C09K 8/94 |
| 2017/0174512 | A1 | 6/2017 | Oates et al. | |
| 2019/0086287 | A1 | 3/2019 | Rella et al. | |
| 2019/0218442 | A1 | 7/2019 | Elkatatny et al. | |
| 2019/0376374 | A1* | 12/2019 | Ayirala | E21B 43/164 |
| 2020/0096663 | A1 | 3/2020 | Shetty et al. | |
| 2020/0182019 | A1 | 6/2020 | Wang et al. | |
| 2020/0317513 | A1 | 10/2020 | Arkadakskiy et al. | |
| 2021/0178317 | A1 | 6/2021 | Arkadakskiy et al. | |
| 2021/0189856 | A1 | 6/2021 | Gates et al. | |
| 2021/0301658 | A1 | 9/2021 | Zhang et al. | |
| 2022/0065103 | A1 | 3/2022 | Rowe | |
| 2022/0083048 | A1 | 3/2022 | Cella et al. | |
| 2023/0050823 | A1 | 2/2023 | Darrah et al. | |
| 2023/0102312 | A1 | 3/2023 | Darrah | |
| 2023/0323756 | A1* | 10/2023 | Darrah | C01B 3/061 |
| 2024/0426198 | A1 | 12/2024 | Templeton | |

FOREIGN PATENT DOCUMENTS

| | | | | |
|---|---|---|---|---|
| CN | 114506817 | A | 5/2022 | |
| JP | S5343095 | A | 4/1978 | |
| WO | WO-2008128331 | A1 * | 10/2008 | C09K 8/582 |
| WO | 2011034677 | A2 | 3/2011 | |
| WO | 2019224326 | A1 | 11/2019 | |
| WO | 2021091563 | A1 | 5/2021 | |
| WO | WO-2024218543 | A1 * | 10/2024 | E21F 7/00 |

OTHER PUBLICATIONS

Deville et al. "Natural Flows of H2 and associated Diagenetic Processes of Atmospheric CO2 Capture and sequestratin; A Study in the Ophiolites of Oman", Proceedings, 10th Offshore Mediterranean Conference and Exhibition, Ravenna, Italy, Mar. 23-25, 2011, pp. 1-9; (Deville). (Year: 2011).*

US Department of Energy, Office of Fossil Energy and Carbon Management Publication, Sep. 23, 2010, pp. 1-3 (Year: 2010).*

Miller, H. M., et al., "Low Temperature Hydrogen Production During Experimental Hydration of Partially -Serpentnized Dunite" Science Direct, Geochimica et Cosmochimica Acta, vol. 209, pp. 161-183 (Apr. 24, 2017).

Russell, M. J., et al., "Serpentinization as a Source of Energy at the Origin of Life," Geobiology, vol. 8, (Nov. 9, 2010) pp. 355-371.

Verlaguet, A., et al., Fluid Circulation Along an Oceanic Detachment Fault: Insights From Gluid Inclusions in Silicified Brecciated Fault Rocks (Mid-Atlantic Ridge at 13 20'N), Geochemistry, Geophysics, Geosystems, vol. 22, No. 1, (Jan. 6, 2021) pp. 1-32.

Extended European Search Report of European Patent Application No. 22848810.2 dated May 7, 2025, 11 pages.

Brazil Office Action and Search Report dated of Brazil Patent Application No. BR112024001869-5 dated Mar. 17, 2025.

Kelemen, et al., "Engineered carbon mineralization in ultramafic rocks for CO2 removal from Air: Review and New insights", (2020). Chemical Geology, 550, 119628. https://doi.org/10.1016/j.chemgeo.2020.119628. (22 Pages).

Mcqueen, et al., "Ambient weathering of magnesium oxide for CO2 removal from Air", (2020). Nature Communications, 11(1). https://doi.org/10.1038/s41467-020-16510-3. (10 Pages).

Worman, et al., "Abiotic hydrogen {H2) sources and sinks near the Mid-Ocean Ridge {MOR) with implications for the ,ubseafloor biosphere", (2020). Proceedings of the National Academy of Sciences, 117(24), 13283---13293. https://doi.org/10.1073/pnas.2002619117. Downloaded from https://www.pnas.org on Apr. 12, 2022. (11 Pages).

Worman, "Global Rates of Free Hydrogen {H2) Production by Serpentinization and other Abiogenic Processes within Young Ocean Crust", Department of Earth and Ocean Sciences Duke University, 2015. (112 pages).

Wang, et al. "Enhanced Hydrogen Production with Carbon Storage by Olivine Alteration in CO2-Rich Hydrothermal Environments." Journal of CO2 Utilitzation, vol. 30, 20219, pp. 205-213, https://doi.org/10.1016/j.jcou.2019.02.008. (9 Pages).

Doveton, "Basics of Oil & Gas Log Analysis" [online], 1999 (1999) [retrieved on 2023-7-24]. Retrieved from the internet: < URL: https://www. kgs.ku.edu/PRS/l nfo/pdf/doveton.PDF> (3 Pages).

International Search Report and Written Opinion mailed Oct. 12, 2023 for International Application No. PCT/ US2023/024711. (18 Pages).

International Search Report and Written Opinion mailed Oct. 10, 2023 for International Application No. PCT/US2023/024721. (13 Pages).

International Search Report and Written Opinion mailed Oct. 24, 2023 for International Application No. PCT/US2023/024723. (12 Pages).

International Search Report and Written Opinion mailed Aug. 11, 2023 for International Application No. PCT/ US2023/016610. (21 Pages).

International Search Report and Written Opinion mailed Aug. 30, 2023 for International Application No. PCT/US2023/018331. (21 Pages).

International Search Report and Written Opinion mailed Aug. 31, 2023 for International Application No. PCT/ US2023/024719. (11 Pages).

WO2023007467 International Search Report; mailed on Dec. 29, 2022.

Third Party Observation dated Oct. 17, 2023 from counterpart International Patent Application PCT/IB2022/057090 (5 pages).

Osselin, Florian; "Reactive Transport Experiments of Coupled Carbonation and Serpentinization in a Natural Serpentinite. Implication for Hydrogen Production and Carbon Geological Storage," 2021 Goldschmidt Conference presentation, Jul. 9, 2021 (20 pages).

Osselin, Florian; "Reactive Transport Experiments of Coupled Carbonation and Serpentinization in a Natural Serpentinite. Implication for Hydrogen Production and Carbon Geological Storage," Cryspom VII Conference presentation, Jun. 3, 2020 (24 pages).

Osselin, Florian; "Insights from Reactive Percolation Experiments on the Geological Storage of CO2 in Natural Serpentinites," 2021 Interpore Conference presentation, Jun. 3, 2021 (18 pages).

Osselin, Florian; "Insights from Reactive Percolation Experiments on the Geological Storage of CO2 in Natural Serpentinites," 2021 Interpore Conference speakers notes, Jun. 3, 2021 (5 pages).

Osselin, Florian; "Reactive Percolation Experiments of the Coupling between Serpentinization and Carbonation in Natural Serpentinite: Implications for H2 Production and CO2 Sequestration," 2021 Natural Hydrogen: State of Research in France Conference abstract, Jun. 28, 2021 (1 page).

Osselin, Florian; "Reactive Percolation Experiments of the Coupling between Serpentinization and Carbonation in Natural Serpentinite: Implications for H2 Production and CO2 Sequestration," 2021 Natural Hydrogen: State of Research in France Conference original poster, Jun. 28, 2021 (1 page).

(56) References Cited

OTHER PUBLICATIONS

Osselin, Florian; "Reactive Percolation Experiments of the Coupling between Serpentinization and Carbonation in Natural Serpentinite: Implications for H2 Production and CO2 Sequestration," 2021 Natural Hydrogen: State of Research in France Conference translated poster, Jun. 28, 2021 (1 page).
Osselin, Florian; "Experimental Study of the Co-Valorization of Carbon Dioxide Storage through Hydrogen Production in Ultramafic Geological Formations," Fall 2019 American Geophysical Union Meeting translated poster, Dec. 9, 2019 (1 page).
Osselin, Florian; "Experimental Study of the Co-Valorization of Carbon Dioxide Storage through Hydrogen Production in Ultramafic Geological Formations," Fall 2019 American Geophysical Union Meeting abstract, Dec. 9, 2019 (1 page).
Osselin, Florian et al.; "Reactive Transport Experiments of Coupled Carbonation and Serpentinization in a Natural Serpentinite. Implications for Hydrogen Production and Carbon Geological Storage," Geochemica et Cosmochimica Acta, Issue 318, p. 165-189, Feb. 26, 2021 (25 pages).
Goffe, Bruno. "Is Natural (Native) Hydrogen Only a Scientific Curiousity or Could be a Challenge for Energy," 2014 Cerege CNRS-AMU Conference, Dec. 11, 2014 (36 pages).
Andreani, Muriel et al.; "Aluminum Speeds Up the Hydrothermal Alteration of Olivine," American Mineralogist, Issue 98, p. 1738-1744, Oct. 1, 2013 (7 pages).

* cited by examiner 400
412A
412N
Mafic/Ultramafic Rock
Fluid Flows Out
Fluid Injected Into Well
402
404
406
408
410
Fluid Tank
Depths Providing Suitable Temperatures

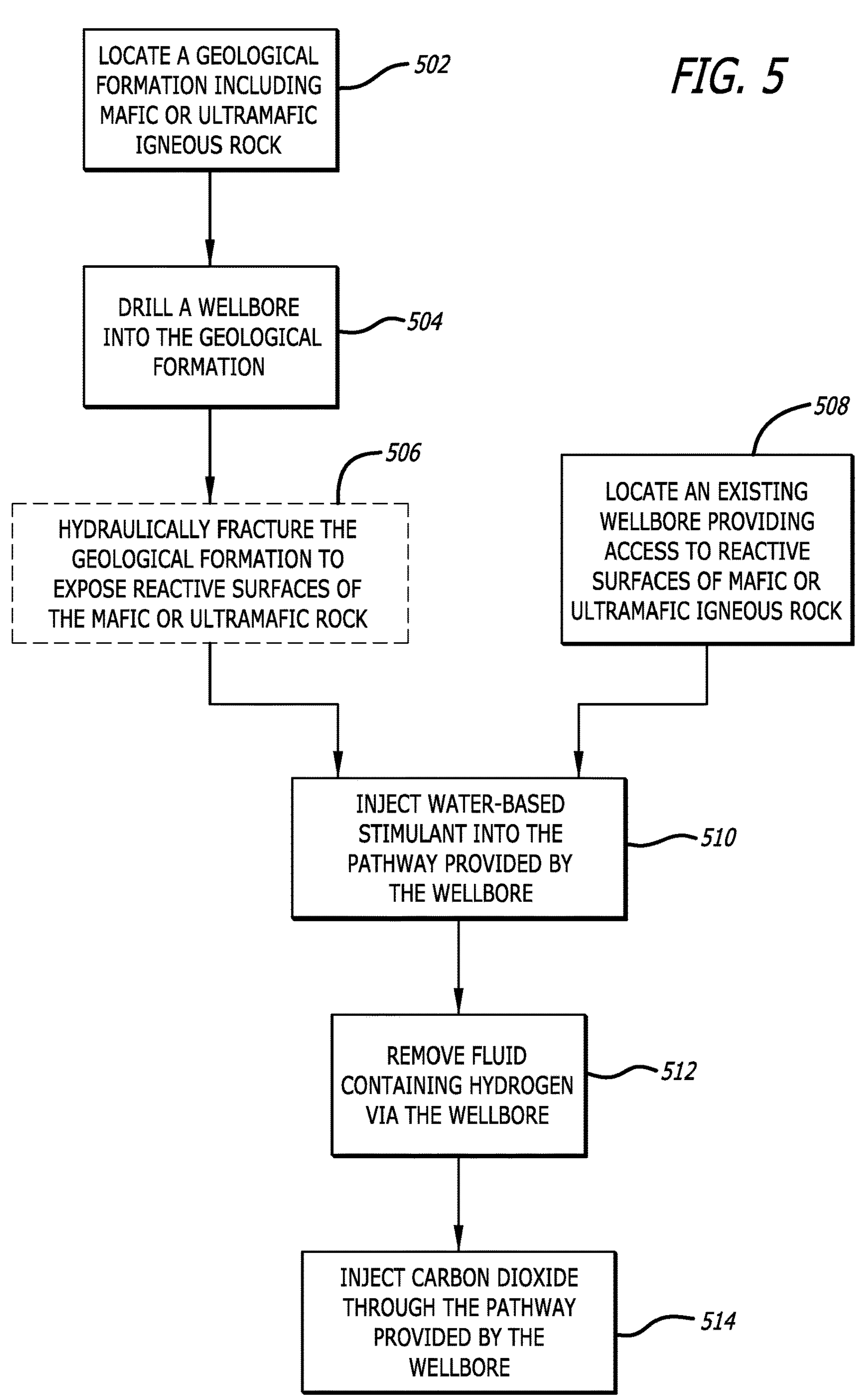
FIG. 5
LOCATE A GEOLOGICAL FORMATION INCLUDING MAFIC OR ULTRAMAFIC IGNEOUS ROCK
502
DRILL A WELLBORE INTO THE GEOLOGICAL FORMATION
504
HYDRAULICALLY FRACTURE THE GEOLOGICAL FORMATION TO EXPOSE REACTIVE SURFACES OF THE MAFIC OR ULTRAMAFIC ROCK
506
LOCATE AN EXISTING WELLBORE PROVIDING ACCESS TO REACTIVE SURFACES OF MAFIC OR ULTRAMAFIC IGNEOUS ROCK
508
INJECT WATER-BASED STIMULANT INTO THE PATHWAY PROVIDED BY THE WELLBORE
510
REMOVE FLUID CONTAINING HYDROGEN VIA THE WELLBORE
512
INJECT CARBON DIOXIDE THROUGH THE PATHWAY PROVIDED BY THE WELLBORE
514

SYSTEMS AND METHODS FOR GENERATION OF HYDROGEN BY IN-SITU (SUBSURFACE) SERPENTINIZATION AND CARBONIZATION OF MAFIC OR ULTRAMAFIC ROCK

CROSS-REFERENCE TO RELATED APPLICATIONS

This application is a continuation of U.S. patent application Ser. No. 17/815,903, filed Jul. 28, 2022, which claims the benefit of U.S. Provisional Patent Application No. 63/203,815, filed Jul. 30, 2021. The entire contents of both applications are incorporated herein by reference.

BACKGROUND

The environmental impact of greenhouse gases, primarily carbon dioxide ($CO_2$) and methane ($CH_4$), has been the subject of much public debate over the past several decades. More recently, self-imposed private-sector initiatives and government-mandated regulations to reduce the release of greenhouse gases into the environment have begun to be implemented. In addition to the capture and/or sequestration of carbon dioxide and other greenhouse gases to mitigate their atmospheric release, much research and development effort has been focused on the utilization of alternatives to fossil fuel combustion for energy production in order to reduce the amount of carbon dioxide generated and/or that must be captured and sequestered.

Hydrogen ($H_2$) gas holds promise as an energy source (e.g., as hydrogen fuel or through the use of green ammonia) and chemical feedstock (e.g., methanol, ammonia, hydrocarbon fuels) that provides little-to-no greenhouse gas emission upon combustion. Indeed, the combustion of hydrogen gas yields just water as a reaction product. However, hydrogen gas has traditionally been produced using fossil fuels (e.g., via natural gas/methane conversion in a steam reformer), which yields the greenhouse gas carbon dioxide as a reaction product. For example, in the steam-methane reforming reaction mentioned, methane is reacted with steam (i.e., water) to produce hydrogen gas and carbon monoxide. In a subsequent water-gas shift reaction, the carbon monoxide is further reacted with steam to produce carbon dioxide and additional hydrogen gas. The hydrogen gas is subsequently separated from the carbon dioxide through pressure swing adsorption, membrane separation, or another gas separation process. Thus, most hydrogen that is produced in refinery operations, for example, produces greenhouse gases, which must be captured and sequestered to yield meaningful benefit.

Alternatively, hydrogen gas may be generated by the electrolysis of water into hydrogen gas and oxygen. The hydrogen gas is subsequently separated from oxygen through pressure swing adsorption, membrane separation, or another gas separation process. Hydrogen production via electrolysis, or partial pyrolysis reactions, requires a substantial amount of electricity. While at least some of the required electricity for hydrogen production via electrolysis and/or partial pyrolysis reactions may be obtained from renewable sources (e.g., wind, solar, and hydroelectric), in practice the majority of the electricity used for hydrolysis has traditionally been, and continues to be, produced through the combustion of fossils fuels, which also produces greenhouse gases.

The abiotic production of hydrogen gas is known to occur in certain geological formations, e.g., at young oceanic crust near a mid-oceanic ridge, as depicted in FIGS. 1A-1D. These natural reactions occur across a range of environmental conditions that include variable pH, oxygen fugacity, chemical composition, and pressure. Such reactions produce variable and complex mineralogy and chemistry but do not predictably produce any specific combination of reaction products. In fact, as generally illustrated in the cross-section photograph of FIG. 2, rock deposits 200 that may yield abiotic hydrogen often contain complex mixtures or layers of difficult-to-extract mineral phases, or will not produce a desired product if other competing reactions are preferred based on in situ geochemical conditions (e.g., variable redox potential (Eh), pH, pore water composition, gas chemical composition, and temperature). For example, the kinetics and scale of hydrogen production is highly variable in nature and its occurrence greatly depends on pH, Eh, and other aspects of fluid geochemistry in pore spaces and at mineral surfaces. Thus, the complex kinetics of reaction phases and the occurrence of competing reactions in natural conditions (e.g., circumneutral pH, variable oxygen fugacity, and variable pore water chemistry) govern the products yielded by these naturally occurring reactions. Certain geological formations and/or the rocks thereof are also known to contain minerals that are conducive to reaction with carbon dioxide under certain conditions to form carbonated mineral phases, e.g., carbonates.

BRIEF SUMMARY

FIG. 3 provides a map that highlights the example locations of selected suitable and/or robust deposits of mafic and ultramafic rock around the world. Olivine- and pyroxene-bearing ores may be found in such mafic and/or ultramafic formations. As can be understood from FIG. 3, sources of mafic and ultramafic igneous rocks may be found in many locations and are quite plentiful, accounting for at least 10% of the continental crust of the Earth, which illustrates the global applicability of solutions described herein. More recently, such sources of mafic and ultramafic igneous rock have garnered interest for their potential exploitation to sequester (mineralize) carbon dioxide in carbonate mineral phases. However, despite significant prior work on carbon sequestration, there is considerable debate about the best mechanistic reactions and optimized rates for carbon mineralization. As such, the economic viability of in situ processes has not been fully developed nor has the hydrogen generation and carbon sequestration capacity of mafic and ultramafic rocks in the subsurface been realized. Moreover, optimizing porosity, permeability, and fracture generation in the subsurface are required to in order to achieve sufficient surface area for reactions to reach thermodynamic completion and/or economic feasibility.

Despite the theoretical potential for such geological formations and/or the ores thereof to be exploited for geological hydrogen or other products, and for potential carbon sequestration, the processes and kinetics of these reactions has not been rigorously evaluated nor optimized for subsurface or subterranean conditions. Further, processes for the production of hydrogen from these geological formations in the subsurface have not been developed. Accordingly, Applicant has recognized a need for systems and methods that exploit certain geological formations and/or the ores thereof in situ to liberate and/or generate hydrogen from geological formations that include olivine- and pyroxene-rich ores, and in addition, sequester carbon dioxide as carbonates.

The disclosure herein provides one or more embodiments of systems and methods for recovery of hydrogen and sequestration of carbon dioxide via in situ engineered operations within mafic and/or ultramafic rock formations.

For example, a method for producing hydrogen gas from a geological formation comprising mafic igneous rock, ultramafic igneous rock, or a combination thereof may include providing a wellbore that at least partially traverses the geological formation, the wellbore providing a pathway for injection of fluids into the geological formation and recovery of fluids therefrom, injecting a water-based stimulant through the pathway provided by the wellbore and into contact with reactive surfaces of the geological formation and, recovering a fluid composition comprising hydrogen gas from the wellbore via the pathway.

In some embodiments, the method may include hydraulically fracturing the geological formation by pumping the water-based stimulant at high pressure through the wellbore and into the geological formation. In some embodiments, the water-based stimulant does not include carbon dioxide. In some embodiments, the water-based stimulant includes dihydrogen sulfide. In some embodiments, the water-based stimulant has an oxygen fugacity with a negative Eh value. In some embodiments, the water-based stimulant has a salinity of about 0.1 to 4.5 per mil sodium chloride. And in some embodiments, the water-based stimulant that is injected into the pathway has a pH of between about 8.3 and about 11.1.

In some embodiments, the pressure proximate to the reactive surfaces of the geological formation is in excess of about one atmosphere (~1 bar) and below the lithostatic pressure of the target formation. Moreover, in some embodiments, the reactive surfaces of the geological formation have a temperature of between about 60° C. and about 260° C. Alternatively, the reactive surfaces of the geological formation may have a temperature above about 260° C. In the latter case, the method may include minimizing interaction of carbon dioxide with the reactive surfaces of the geological formation during injection of the water-based stimulant. In various embodiments, the reactive surfaces of the geological formation comprise one or more of fayalite, ferrosilite, or a combination thereof.

In some embodiments, the method includes evacuating fluid from the geological formation prior to injecting the water-based stimulant through the pathway provided by the wellbore and into the geological formation.

In some embodiments, the fluid composition recovered from the wellbore further comprises one or more redox-sensitive components from the rock formation. In some such embodiments, the method may further include separating the one or more redox-sensitive components from the fluid composition recovered from the wellbore.

In various embodiments, the method may include using the fluid composition recovered from the wellbore as a fuel. Additionally, or alternatively, recovering the fluid composition from the wellbore via the pathway may include storing the fluid composition proximate to the wellbore, and/or transporting the fluid composition via pipeline.

In some embodiments, the method includes injecting carbon dioxide through the pathway provided by the wellbore and into the geological formation after the fluid composition is recovered, wherein reaction of at least a portion of the carbon dioxide with one or more of mafic or ultramafic rocks in the geological formation generates at least magnesium carbonate or calcium carbonate. In some such embodiments, the injected carbon dioxide comprises a mixture of water and carbon dioxide. For instance, this mixture of water and carbon dioxide may have a pH of between about 4.8 and about 6.5. In addition, this mixture of water and carbon dioxide may have a salinity of between 0.1 to 4.5 per mil sodium chloride. Furthermore, this mixture of water and carbon dioxide may contain nitrogen, dihydrogen sulfide, methane, or other trace gases.

In various embodiments, carbon dioxide injected into the geological formation may be injected at a pressure of between one bar and the lithostatic pressure of the target formation. Additionally, the carbon dioxide that is injected into the geological formation may comprise supercritical carbon dioxide or a mixture of supercritical carbon dioxide and other fluids. In some embodiments, injecting the carbon dioxide through the pathway provided by the wellbore is conducted as part of a well stimulation process.

Corresponding means for performing the various method steps are set forth below.

An example system for recovery of hydrogen and/or sequestration of carbon dioxide via in situ engineered operations within mafic and/or ultramafic rock formations may include a wellbore that at least partially traverses the geological formation, a source of water-based stimulant configurable to be in fluid communication with the wellbore to allow the water-based stimulant to pass to the geological formation through a pathway defined at least partially by the wellbore, a fluid containment device positioned about an upper portion of the wellbore, the fluid containment device having one or more outlets through which a fluid composition containing hydrogen gas may be recovered from the wellbore, and a source of carbon dioxide configurable to be in fluid communication with the wellbore to allow the carbon dioxide to pass to the geological formation through the pathway defined at least partially by the wellbore.

In some embodiments, the system includes a pipeline connected to the one or more outlets of the fluid containment device to output the fluid composition containing hydrogen gas that passes through the fluid containment device from the wellbore. The system may further include a fluid storage vessel connected to the one or more outlets of the fluid containment device to store the fluid composition containing hydrogen gas that passes through the fluid containment device from the wellbore. Furthermore, the fluid containment device may be a wellhead.

In various embodiments, the source of carbon dioxide is configurable to provide the carbon dioxide to the wellbore at a pressure of between one atmosphere (~1 bar) and the lithostatic pressure of the target formation. In some such embodiments, the provided carbon dioxide may be supercritical carbon dioxide or a mixture of supercritical carbon dioxide and other fluids. In some embodiments, the carbon dioxide may be a mixture of water and carbon dioxide, and in some such embodiments, the mixture may have a pH of between about 4.8 and about 6.5 and/or a salinity of between 0.1 to 4.5 per mil sodium chloride. Still further, in some embodiments the carbon dioxide may be a mixture of water and carbon dioxide containing nitrogen, dihydrogen sulfide, methane, and/or other trace gases.

In various embodiments, the water-based stimulant may contain hydrogen sulfide. This water-based stimulant may have an oxygen fugacity with a negative Eh value. In addition, the water-based stimulant may have a salinity of between about 0.1 to 4.5 per mil sodium chloride. Furthermore, the water-based stimulant may have a pH of between about 8.3 and about 11.1.

In some embodiments, the system may further include fracturing equipment configurable to hydraulically fracture an area of the geological formation proximate to the wellbore.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 5 illustrates an example flowchart for enhancing the in situ evolution of hydrogen gas from mafic or ultramafic igneous rock, in accordance with some example embodiments described herein.

DETAILED DESCRIPTION

Figure 1A:
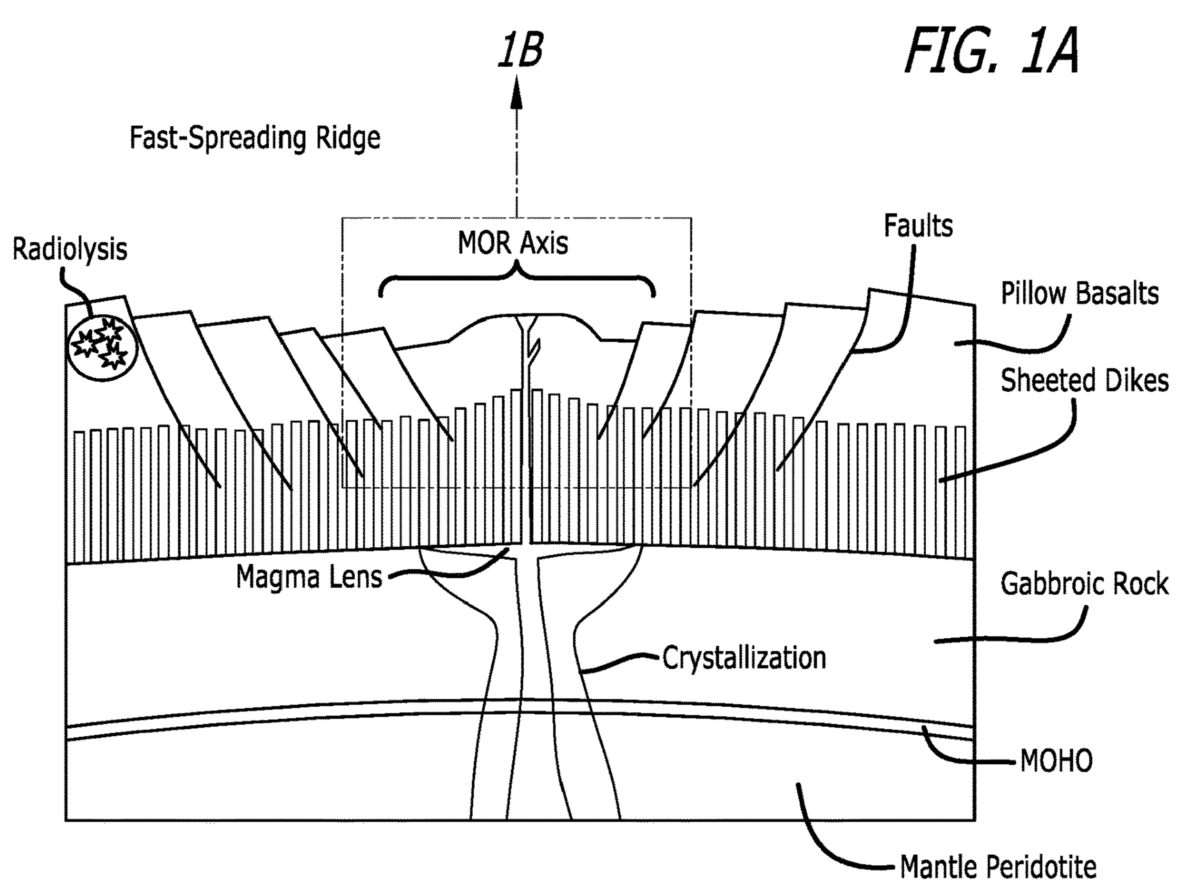
FIGS. 1A, 1B, 1C, and 1D illustrate cross-sectional representations of young oceanic crust and associated structures positioned near a theoretical mid-oceanic ridge that may produce and/or host abiotic hydrogen production.
Figure 1B:
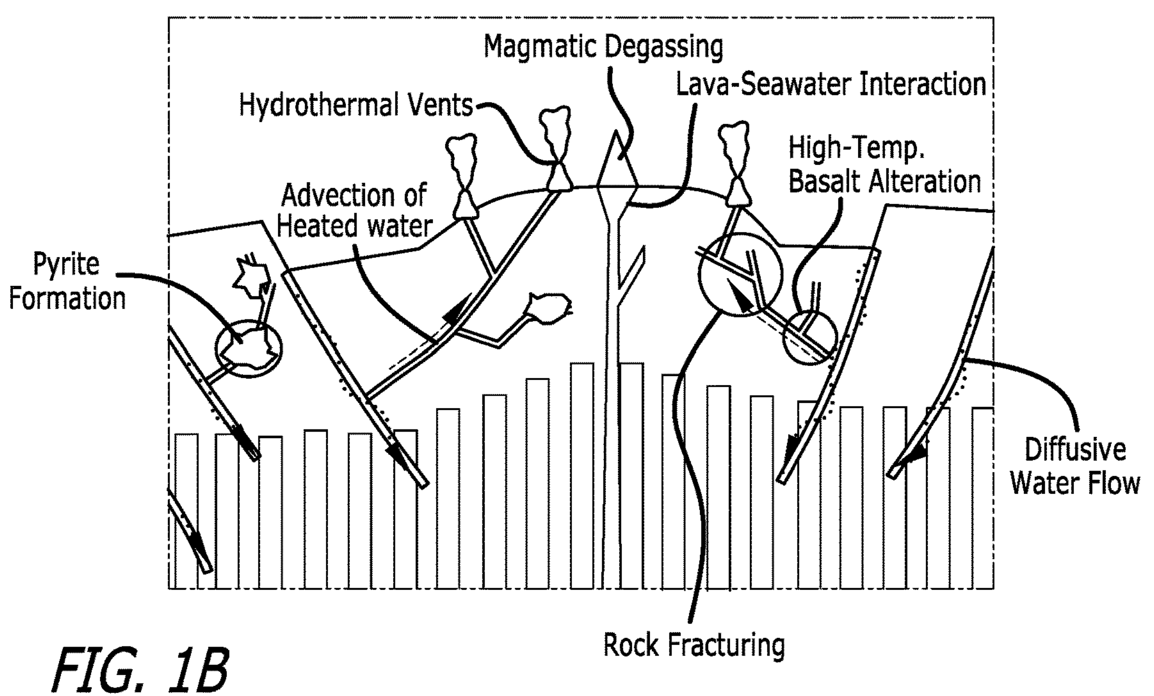
Figure 1C:
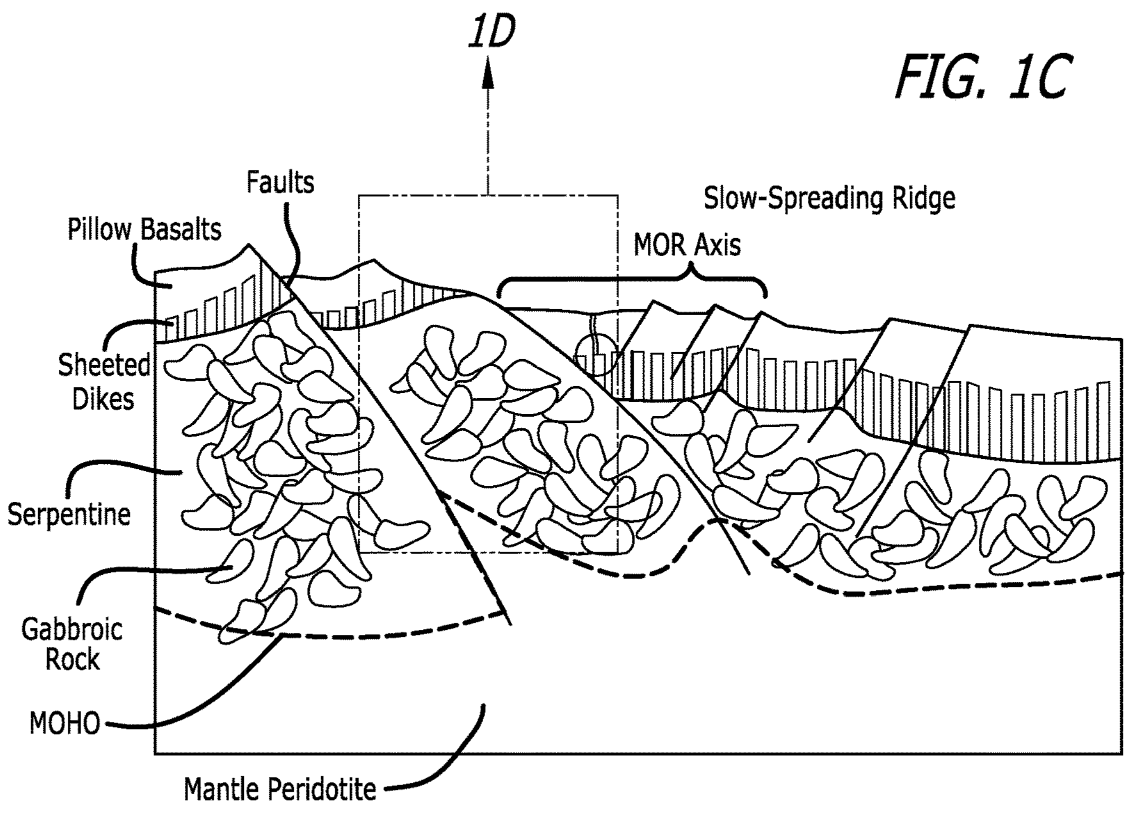
Figure 1D:
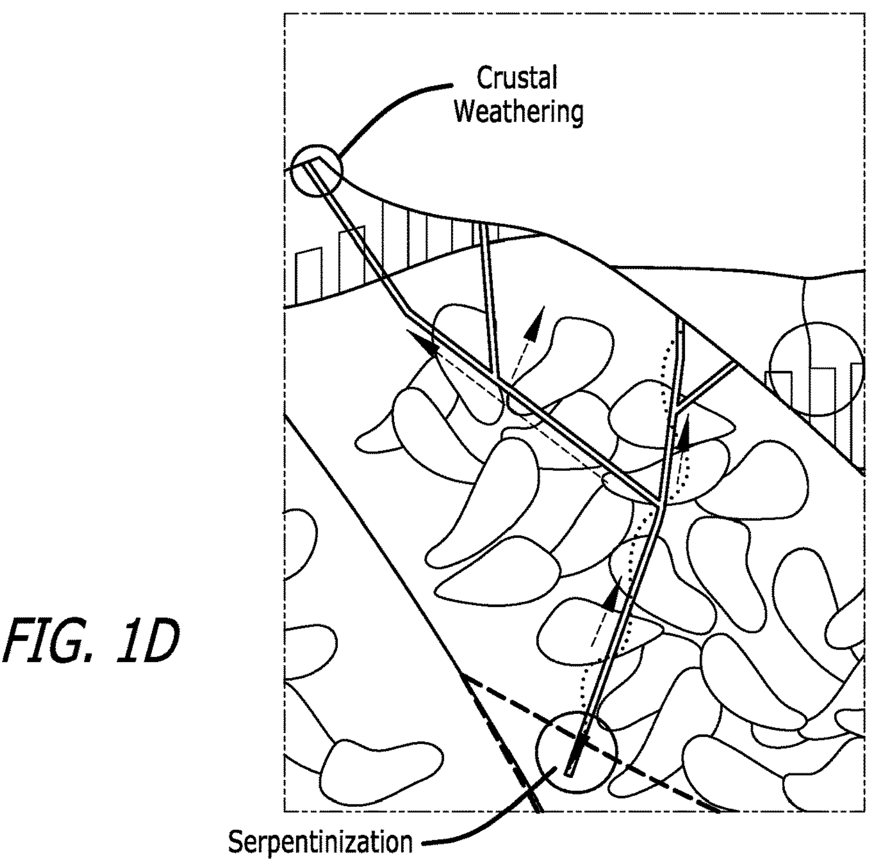
Figure 2:
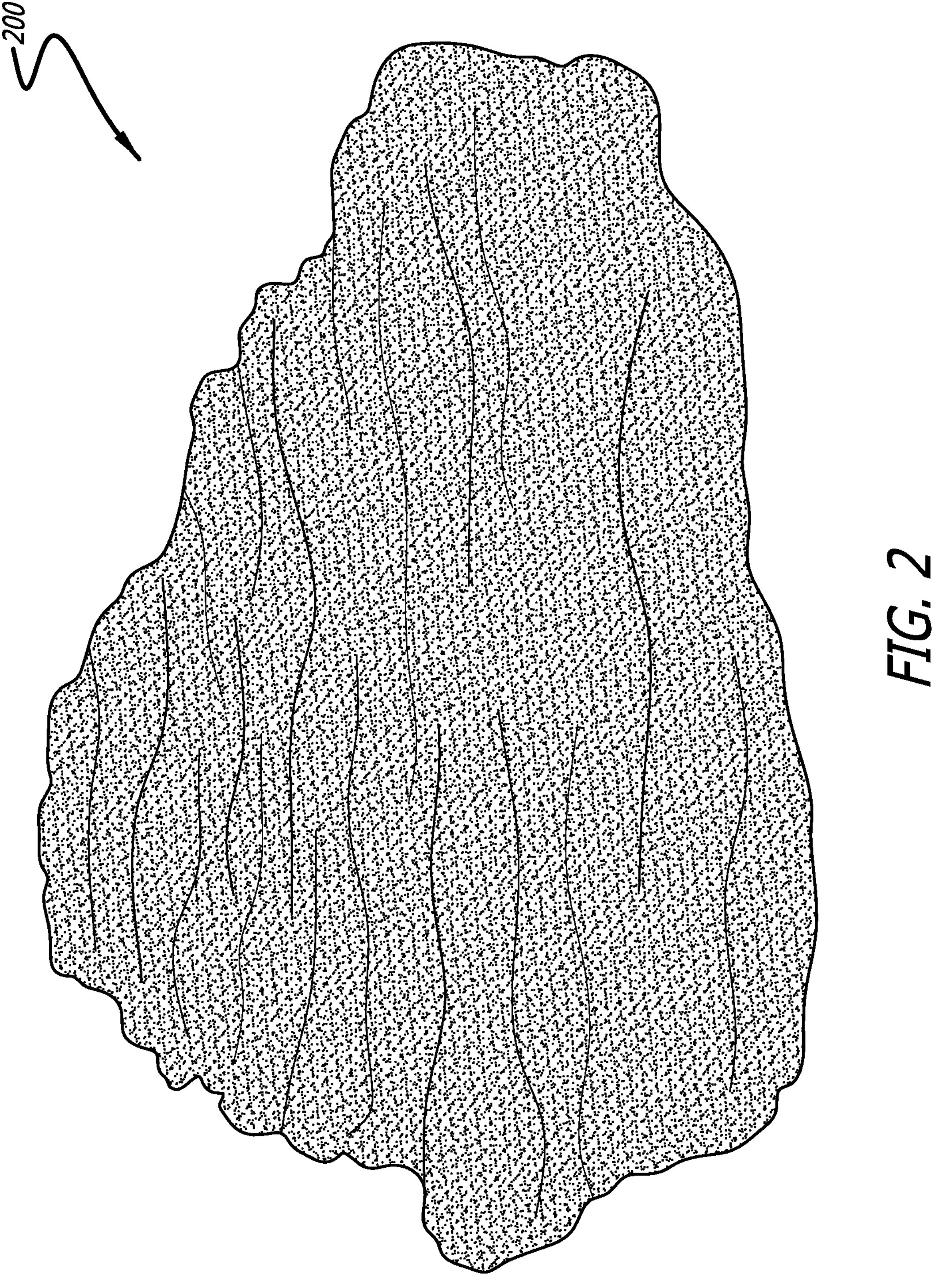
FIG. 2 illustrates an example cross-section of serpentinized ultramafic rock.
Figure 3:
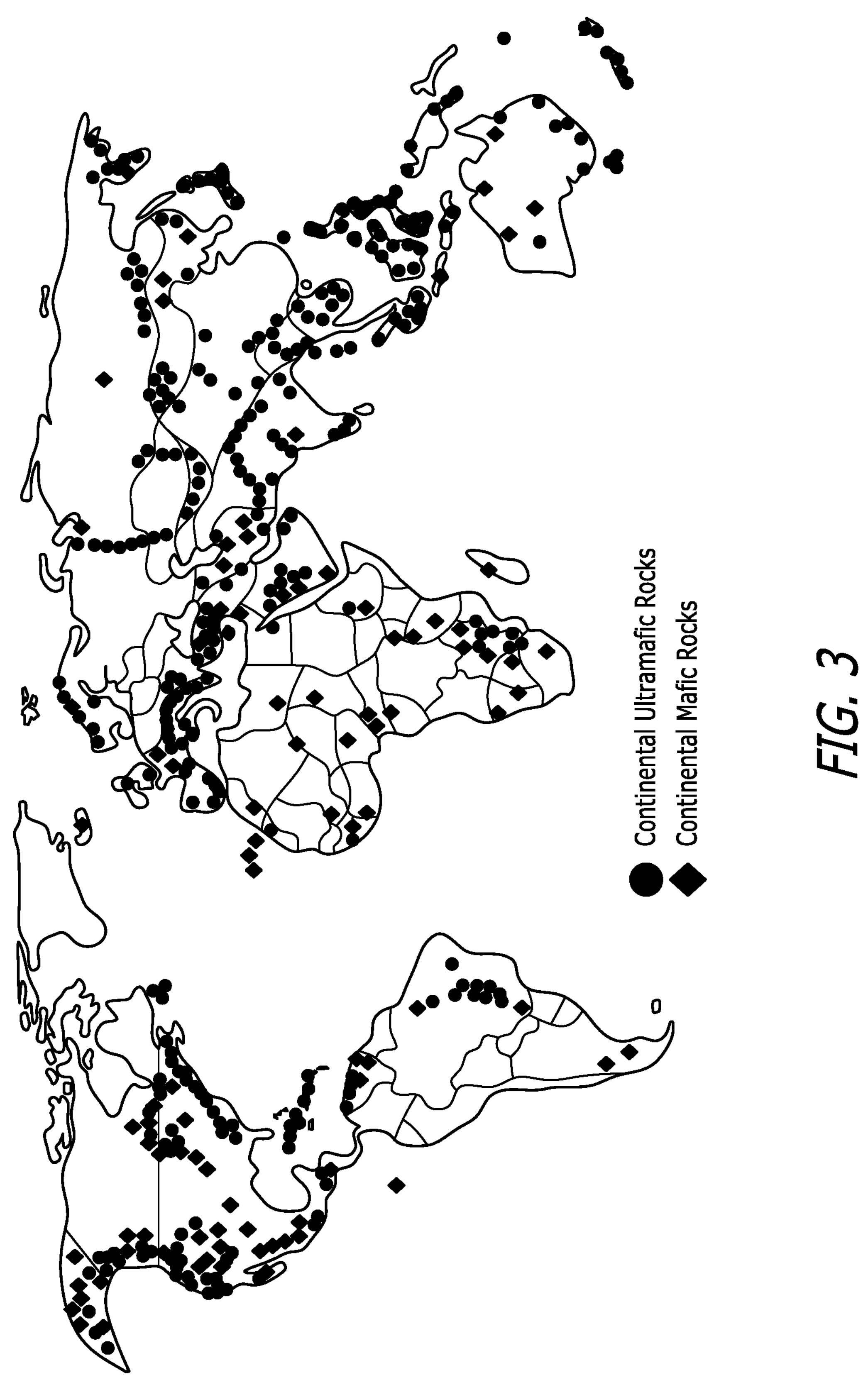
FIG. 3 illustrates a map with locations of suitable olivine- and pyroxene-bearing localities throughout the world.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

Overview

The production of hydrogen and sequestration of carbon dioxide are critical hurdles that must be cleared for society to transition towards a future economy less reliant on carbon-rich fossil fuels. As noted previously, example embodiments described herein provide systems and methods to do both in the same operation by applying unique stimulus to mafic and/or ultramafic igneous rock in situ in order to prompt the serpentinization reactions that generate hydrogen and the carbonation reactions that mineralize carbon. To implement various embodiments contemplated herein requires a wellbore that at least partially traverses a mafic or ultramafic igneous rock formation. The wellbore provides a pathway for the injection of fluids into the mafic or ultramafic portions of the geological formation and recovery of fluids therefrom. As described in greater detail below, a two-step reaction is utilized by example embodiments that first generates hydrogen through the injection of a water-based stimulant (the particular characteristics of which are described below) into the wellbore, and then sequesters carbon dioxide in the rock formation through the injection of carbon dioxide into the wellbore for permanent storage in the rock formation. Example embodiments can achieve both meaningful hydrogen recovery and carbon sequestration by identifying rock formations having suitable characteristics, subsurface depths that optimize the preferred chemical reactions of fluids with rock, the sequencing and nature of fluid injection and recovery, and the particular characteristics of the fluid to be injected into the rock formation.

In contrast to a strategy for ex situ generation of hydrogen and sequestration of carbon dioxide, unique mechanistic processes are required to optimize the economics of hydrogen generation and commensurate sequestration of carbon dioxide in the subsurface. In an ex situ environment, sufficiently complete hydraulic stimulation and/or rock comminution can be performed that maximizes the effectiveness of both hydrogen-generating reactions and carbonation reactions. However, the degree of hydraulic stimulation and rock comminution that may be possible ex situ is simply not achievable within the subsurface; hence, additional consideration is required to stage in situ operations in a manner that may not achieve perfect thermodynamic completion of either carbonation or serpentinization reactions, but that will still suitably enhance porosity, permeability, and fracture generation in the subsurface to ensure that the injections of fluids (i.e., water, carbon dioxide, carbon dioxide-rich brines) will promote both hydrogen generation and carbon sequestration at a meaningful scale and in a controllable manner.

While other subsurface carbon sequestration strategies can inject gas-phase carbon dioxide into isolated formations, and into saline aquifers, each of these strategies has significant challenges. With regard to the storage of fluid carbon dioxide, all such strategies create environmental risks and future carbon management challenges because any stored gas may migrate at some future time. Accordingly, carbon mineralization is a preferred mechanism of carbon sequestration (as illustrated by the significantly higher tax credit offered in the United States for permanent carbon sequestration in carbonate minerals than for other forms of storage).

However, existing carbon mineralization strategies also face considerable challenges intrinsically related to the carbon mineralization process. The process of carbon mineralization produces a volumetric expansion of rock, which manifests in situ as a reduction in the porosity, in most cases a reduction in the permeability, and alteration of the fracture characteristics (openness, aperture, pore throat size, connectivity) of fluid flow pathways in the rock, or in a worst case completely closes these fluid flow pathways. The injection of carbon dioxide to cause mineralization of carbon reduces the hydraulic conductivity of the rock into which the carbon dioxide is injected, and hence reduces the potential for both hydrogen generation and the remaining overall capacity to use existing subsurface well infrastructure for ongoing carbon sequestration. Because mafic and ultramafic rocks have very low porosity and permeability to begin with and carbon mineralization in such formations further lowers porosity and permeability, only a relatively low volume of carbon can be sequestered using a strategy focused only on carbon mineralization. This makes the economics of such strategies particularly challenging. A technique that would partially ameliorate the problem is the use of supercritical carbon dioxide, which would allow penetration of any available flow paths to a greater degree than would be possible with carbon dioxide in any other form. Applicants use this aspect in some of their embodiments.

As such, the economic viability of in situ processes has not been fully developed nor has the hydrogen generation and carbon sequestration capacity of mafic and ultramafic rocks in the subsurface been realized. Applicant is unaware of any prior attempts to use an optimized chemical processes of hydrogen generation followed by carbon mineralization to enhance the kinetics and total volumetric capacity of in situ hydrogen production, reservoir fluid flow properties, or carbon sequestration.

Although a high-level explanation of the operations of example embodiments has been provided above, specific details regarding the configuration of such example embodiments are provided below.

Serpentinization and Carbonation Reactions

The disclosure herein provides one or more embodiments of systems and methods that facilitate the production of hydrogen and/or other desired minerals through serpentinization reactions involving olivine- and pyroxene-rich ores found in mafic and/or ultramafic igneous rock. Olivine, a substantial component of both mafic and ultramafic rock, is a solid solution series of a magnesium silicate (forsterite) and an iron silicate (fayalite). In olivine-rich deposits, fayalite is usually the minor constituent and ranges in concentration from 5% to 20% of the olivine, with the lower range concentrations occurring more commonly. Consequently, the thermochemical activity of fayalite in such deposits is relatively low compared to that of the forsterite. Nevertheless, when completed, the reaction produces magnetite, silica, and hydrogen (from the reaction of fayalite with water). Pyroxene, also a common component of both mafic and ultramafic rock, is often composed of a solid solution of ferrosilite and enstatite. As with fayalite, the reaction of ferrosilite (5-20% of the pyroxene) with water generates magnetite, silica, and hydrogen.

Table I, provided below, gives representative serpentinization reactions involving fayalite ($Fe_2SiO_4$), ferrosilite ($Fe_2Si_2O_6$), and forsterite ($Mg_2SiO_4$). Fayalite and forsterite are mineral phases that are associated with olivine-rich ore and ferrosilite is a mineral phase that is associated with pyroxene-rich ore. Under certain conditions (i.e., pH greater than 8, low oxygen fugacity (with a negative Eh value or negative electric potential)), water reacts with fayalite and ferrosilite to generate magnetite ($Fe_3O_4$), silica ($SiO_2$), and hydrogen gas ($H_2$) in the appropriate stoichiometric ratios. In each case, two moles of hydrogen gas are produced from three moles of either fayalite or ferrosilite mineral. Under other conditions (acidic or circum-neutral pH, oxidizing conditions), water reacts with forsterite to generate antigorite ($Mg_3Si_2O_5(OH)_4$), brucite ($Mg(OH)_2$), and/or a host of other accessory mineral phases in the appropriate stoichiometric ratios. In such case, zero moles of hydrogen gas are produced from the two moles of forsterite mineral, while the commensurate mineralization of carbon dioxide, which is favored under these conditions, reduces porosity, permeability, and potential for fluid flow.

TABLE 1

Hydrogen-Generating Serpentinization Reactions
Serpentinization Reactions

| Mineral | Mineral Phase | Reaction | Moles of Igneous Material | Moles of $H_2$ |
|---|---|---|---|---|
| Olivine | Fayalite | $3Fe_2SiO_4 + 2H_2O \rightarrow 2Fe_3O_4 + 3SiO_2 + 2H_2$ | 3 | 2 |
| Pyroxene | Ferrosilite | $3Fe_2Si_2O_6 + 2H_2O \rightarrow 2Fe_3O_4 + 6SiO_2 + 2H_2$ | 3 | 2 |
| Olivine | Forsterite | $2Mg_2SiO_4 + 3H_2O \rightarrow Mg_3Si_2O_5(OH)_4 + Mg(OH)_2$ | 2 | 0 |

In one or more embodiments, the disclosed systems and methods may also facilitate the sequestration of gaseous carbon dioxide (e.g., as carbonate mineral phases) through carbonation reactions involving olivine- and pyroxene-rich ores found in mafic and/or ultramafic rock. Table II, provided below, gives representative carbonation reactions involving forsterite ($Mg_2SiO_4$), enstatite ($Mg_2Si_2O_6$), anorthite ($CaAl_2Si_2O_8$), antigorite ($Mg_3Si_2O_5(OH)_4$), and brucite ($Mg(OH)_2$). Forsterite is a mineral phase that is associated with olivine-rich ore, enstatite is a mineral phase that is associated with pyroxene-rich ore, anorthite is a mineral phase that is associated with plagioclase-rich ore, antigorite and brucite are mineral phases that are associated with a serpentine-rich ore.

Carbon dioxide reacts with forsterite, enstatite, anorthite, and/or antigorite to generate at least magnesium carbonate (or at least calcium carbonate in the case of anorthite) and silica ($SiO_2$) (or kaolinite ($Al_2Si_2O_5(OH)_4$ in the case of anorthite); these reactions are favored in acidic conditions in the presence of water and $CO_2$. The reaction of antigorite and brucite with carbon dioxide further yields a stoichiometric quantity of water. In the case of the carbonation reaction involving forsterite and enstatite, two moles of carbon dioxide gas are converted to magnesium carbonate per mole of either forsterite or enstatite mineral. For the carbonization of antigorite, three moles of carbon dioxide gas are converted to magnesium carbonate per mole of antigorite. In the case of anorthite, three moles of carbon dioxide gas are converted to calcium carbonate per mole of anorthite. Finally, the reaction of brucite with carbon dioxide yields one mole of magnesium carbonate per two moles of water as shown in the stoichiometric ratios set forth in Table 2.

TABLE 2

Carbon-Sequestering Carbonation Reactions
Decarbonation Reactions

| Mineral | Mineral Phase | Reaction | Moles of Igneous Material | Moles of $CO_2$ |
|---|---|---|---|---|
| Olivine | Forsterite | $Mg_2SiO_4 + 2CO_2 \rightarrow 2MgCO_3 + SiO_2$ | 1 | 2 |
| Pyroxene | Enstatite | $Mg_2Si_2O_6 + 2CO_2 \rightarrow 2MgCO_3 + 2SiO_2$ | 1 | 2 |
| Plagioclase | Anorthite | $CaAl_2Si_2O_8 + CO_2 + 2H_2O \rightarrow CaCO_3 + Al_2Si_2O_5(OH)_4$ | 1 | 1 |
| Serpentine | Asbestos | $Mg_3Si_2O_5(OH)_4 + 3CO_2 \rightarrow 3MgCO_3 + 2SiO_2 + 2H_2O$ | 1 | 3 |
| Brucite | | $Mg(OH)_2 + CO_2 \rightarrow MgCO_3 + 2H_2O$ | 1 | 1 |

In nature, and as previously described, the above-described serpentinization and carbonization reactions occur, but only in a difficult to predict and often chaotic mix of reactions occurring simultaneously (or sequentially) across a range of environmental conditions in situ based on the characteristic of fluids with variable and sometimes changing characteristics (e.g., pH, oxygen fugacity, pore water chemical composition (e.g., salinity), gas chemistry, and pressures found in nature. The multitude of reactions occurring in nature produce variable and complex mineralogy and chemistry, but do not predictably produce any specific combination of usable reaction products.

Applicant has recognized that despite the significant theoretical potential of mafic and/or ultramafic igneous rocks (i.e., olivine- and pyroxene-bearing ores, e.g., with elevated iron content), as described above, the processes and kinetics for serpentinization and carbonation reactions have not been rigorously evaluated nor optimized in the subsurface for productive ends. Accordingly, such reactions have historically not been deployed to utilize geological sources for economic geological hydrogen, to be exploited as natural sources and catalysts for hydrogen production, or for carbon sequestration. Specifically, process steps to enhance the subsurface carbon sequestration and production of hydrogen and/or other minerals from these types of rocks have not been developed. Further, Applicant is unaware of any prior attempts to use an optimized chemical processes of hydrogen generation or carbon mineralization to enhance the kinetics and total volumetric capacity of hydrogen production, reservoir fluid flow properties, or to enhance the capacity for additional subsurface carbon dioxide mineralization.

In Situ Generation of Hydrogen and Sequestration of Carbon Dioxide

In various embodiments contemplated herein, carbon dioxide may be mineralized, and hydrogen may be produced economically (and with an overall neutral to net-negative carbon footprint) by an engineered system using olivine- and pyroxene-rich ores accessed by subsurface drilling and hydraulic stimulation of mafic or ultramafic rock to optimize serpentinization and carbonation reactions. To produce these results, Applicant has developed an engineering process that stimulates sequential reactions that may be performed by and/or within a wellsite system as shown in FIG. 4.

Figure 4:
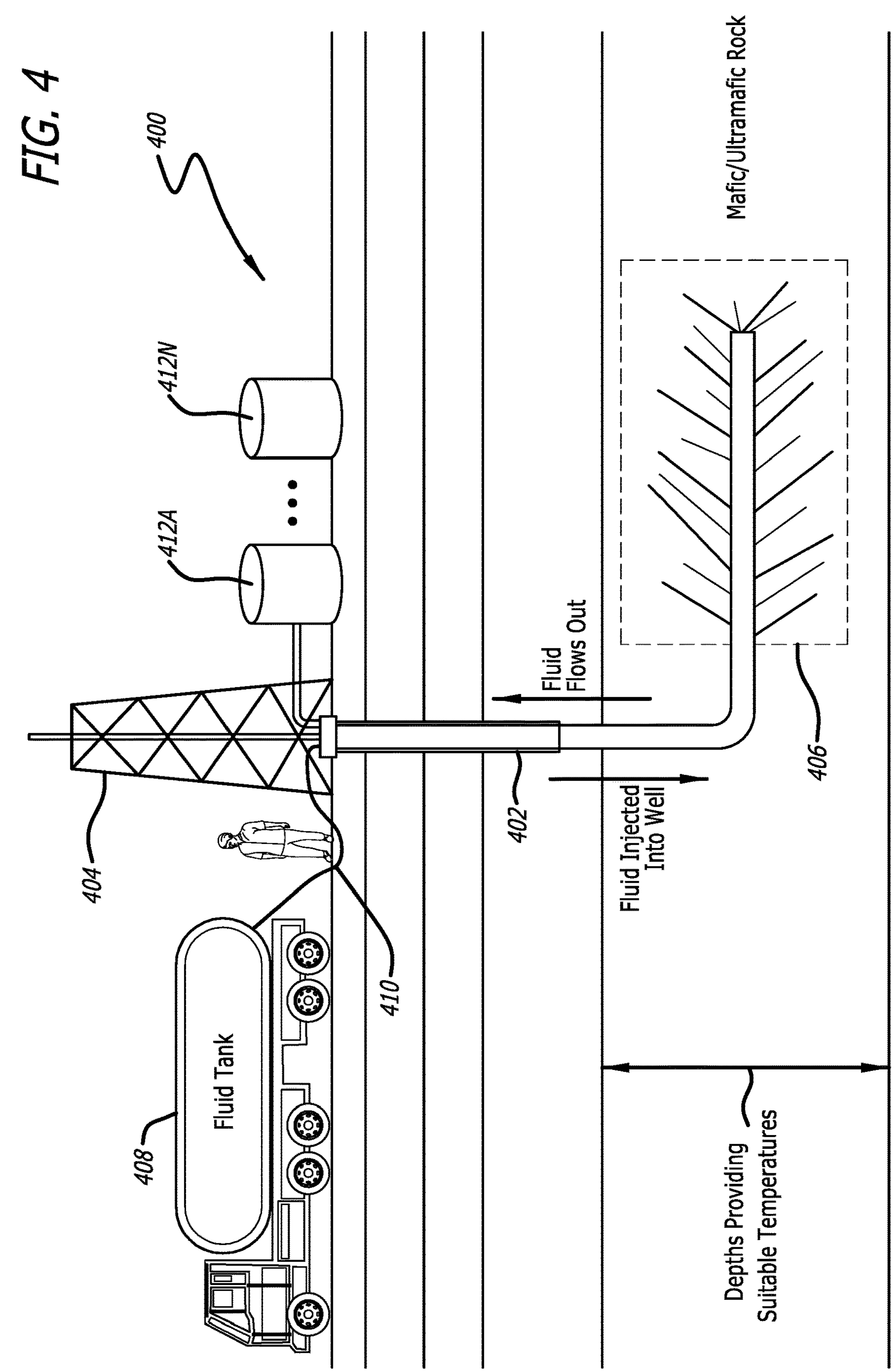
FIG. 4 illustrates an example wellsite proximate to a geological source of mafic or ultramafic igneous rock, in accordance with some example embodiments described herein.

The illustration in FIG. 4 depicts an example engineered system containing a wellsite 400 proximate to a geological formation of mafic or ultramafic igneous rock. As shown in FIG. 4, a system of components is arranged at the wellsite 400 to facilitate the injection of fluids into the geological formation and the recovery of fluids from the geological formation. These components interact with the geological formation via a wellbore 402 that is drilled into the geological formation to permit the injection and recovery of fluids. The wellbore may be drilled in any suitable fashion, such as through the use of a drilling rig 404, as shown in FIG. 4. A fluid containment device such as a wellhead (not shown in FIG. 4) may be positioned about an upper portion of the wellbore 402 (in place of the drilling rig 404) to provide a structural and pressure-containing interface for injection and recovery of fluids from the wellbore 402. The fluid containment device may have one or more outlets through which fluids be injected or recovered from the wellbore 402.

The depth of the wellbore 402 may be designed based on the specific characteristics of the geological formation into which the wellbore 402 is drilled, with the goal of drilling the wellbore 402 to a depth enabling fluid to interact with subsurface regions of the geological formation having suitable temperature for generation of hydrogen or mineralization of carbon dioxide.

The injection of fluids into the geological formation hydraulically stimulates the rock, which may induce or enlarge fractures 406 within the rock formation proximal to the wellbore. For instance, the injection of a water-based stimulant may prompt serpentinization and other reactions within the reactive mineral phases of the rock. As described previously, serpentinization reactions produce hydrogen and lead to chemical reactions (i.e., changes in the constituent minerals) that modify the crystalline structure of the rock formation in ways that introduce additional pore space, permeability, and hydraulic connectivity of the geological formation proximal to the wellbore 402. Without the increase of pore volume during an initial hydrogen generating step, the occurrence of carbon dioxide mineralization processes (i.e., known to occur in natural systems) would reduce the porosity of the constituent mafic and ultramafic rocks. As another example, available technologies such as directional drilling and hydraulic fracturing may be used to induce fractures, and hence increase (engineered secondary) porosity and permeability, and hence increase the surface area suitable for reactions in the subsurface. In this regard, hydraulic stimulation (i.e., hydrofracturing) technologies may utilize fracturing equipment to hydraulically fracture the geological formation by pumping fluid, and possibly proppant, at high pressure through the wellbore 402 and into the geological formation to induce new fractures 406, or to enlarge and/or sustain the fractures 406 already present in the rock formation.

FIG. 4 further illustrates that fluid may be provided for injection into the wellbore 402 by way of a tanker truck loaded with a fluid tank 408. The fluid tank 408 may connect via hose 410 to an outlet of the fluid containment device (which may in turn facilitate transmission of the fluid in fluid tank 408 through the wellbore 402 and into the targeted geological formation). While a fluid tank 408 is shown for ease of illustration, it will be understood that various example embodiments may utilize a variety of different methods delivering fluid to the fluid containment device for injection into wellbore 402. For instance, although such fluids may be received by truck as shown in FIG. 4, fluids may be transmitted by a pipeline or containment pond connecting a source of fluid to the fluid containment device. Similarly, it will be understood that various example embodiments may be configurable to inject any of a variety of different types of fluid (e.g., brine, $CO_2$-rich brine, $H_2S$-rich brine, $CO_2$) into the wellbore 402 via the fluid containment device, such as water-based stimulants and carbon dioxide as described herein, other fluids, such as fracturing fluids and/or proppants, or the like may also be injected into the rock formation via the wellbore 402.

Finally, the wellsite 400 may host one or more fluid storage vessels 412A-412N that may be configurable to connect via pipeline to the fluid containment device (e.g., via a pipeline) and deliver fluids to the fluid containment device for injection into the wellbore 402 or receive fluids recovered from the wellbore 402 via the fluid containment device. Fluid storage vessels 412A-412N may further connect to additional processing or refining components located at the wellsite 400, or may be connected to, or be configurable to connect to pipelines for transmission of stored gas to a remote location away from the wellsite 400. In some embodiments, fluid storage vessels 412A-412N may further be configurable to transmit stored gas to tankers for transportation via truck, rail, or boat, or may in some embodiments themselves be portable and transported in such a manner. Additionally, or alternatively, the recovered fluids may be directly transmitted offsite to a remote location not at the wellsite 400. In some embodiments, the fluids recovered from the wellbore 402 may be utilized on-site as a fuel, either to power processing or refining machinery, or other energy needs at the wellsite, for the generation of heat to be applied to fluid injected into the rock formation, or for any other suitable purpose.

Turning to FIG. 5, a flowchart is illustrated that contains example operations for the in situ generation of hydrogen and sequestration of carbon dioxide, in accordance with embodiments described herein. The procedure set forth in FIG. 5 may begin either from operation 502, where a new well will be drilled to permit the subsequent operations of the procedure, or from operation 508, where an existing well may be repurposed for use in example methods described herein.

Starting first at operation 502, an example method may involve locating a geological formation including mafic or ultramafic igneous rock. As described previously, certain desired reactions that generate hydrogen and sequester carbon involve olivine- and pyroxene-rich ores found in mafic and/or ultramafic igneous rock. Olivine is a solid solution of forsterite and fayalite. In olivine deposits of interest to produce hydrogen, fayalite is usually the minor constituent, ranging from 6% to 20%, usually at the lower end. Pyroxene is often composed of a solid solution series of ferrosilite and enstatite with a similar percentage of iron-bearing ferrosillite. Consequently, the potential thermochemical activity of both fayalite and ferrosillite as part of a solid solution series is relatively low compared to that of pure fayalite and ferrosillite. The mixture of the minerals is almost an "ideal" solution. In an ideal solution, the thermochemical activity varies linearly with the mole fraction and is roughly equal to the mole fraction. Thus, catalyzing a multiple step reaction that first targets one end of the olivine and pyroxene solid solution, the chemical reactivity of the residual phase is enhanced, which further benefits the increased activity stemming from the incipient fractures and corresponding increase in permeability.

Besides the characteristics of the ideal rock formations to utilize for the engineered solutions contemplated herein, economic considerations also drive the identification of appropriate geological formations. To this end, the ideal locations for implementation of example embodiments will have rock formations in close proximity to potential users of the produced hydrogen gas, which may thereby provide nearby end-users of generated hydrogen without the additional cost or logistics involved in transportation of hydrogen gas from a wellsite to a buyer.

Moreover, because a key driver of hydrogen generating reactions is the presence of iron-rich mineral phases in the source rock, other rock formations besides mafic or ultramafic rock may be suitable for certain embodiments contemplated herein. For instance, reduced-iron minerals, such as pyrite, may usefully generate hydrogen when reacted with water, and thus may be suitable sites for the hydrogen generating components of some embodiments contemplated herein (even if such sites are not suitable for subsequent carbon sequestration).

As shown by operation 504, an example method may involve the drilling of a wellbore into the located geological formation. The wellbore may be drilled to a depth having an appropriate temperature profile to catalyze and/or enhance serpentinization reactions. For instance, the serpentinization reactions described previously are highly temperature sensitive, with the reactions starting to generate hydrogen occurring at around 60° C. and above, and wherein the kinetic rate of the reactions is enhanced with increasing temperatures. However, higher temperatures may not be preferred in every embodiment contemplated herein. Above around ~260° C., hydrogen produced in situ from the reaction of water with the source rock may react with carbon dioxide to produce methane in what is known as a Sabatier reaction. Accordingly, in some embodiments the wellbore may be drilled to reach a depth where the geological formation has a temperature of between around 60° C. to around ~260° C., especially in the presence of $CO_2$, which is common and often abundant in the subsurface. However, methane is itself a useful product, so a wellbore that extends into subsurface regions having temperatures above 260° C. may still be suitable in some embodiments in which both hydrogen and methane can be recovered from the geological formation. Moreover, because higher temperature enhances the serpentinization reactions, it is conceivable that higher temperature settings may produce more hydrogen even though some of the produced hydrogen is reacted to produce methane. Finally, in some embodiments, the production of methane via the Sabatier process may be avoided by minimizing the interaction of carbon dioxide with hydrogen in the subsurface, such as by minimizing or eliminating the existence of carbon dioxide in any fluid injected into the well during the first serpentinization/hydration step, in which case drilling a well to a depth offering higher temperatures may also be preferred. At these depths, it is likely that the pressure proximate to the reactive surfaces of the geological formation will be at or in excess of about 50 bars.

As shown by operation 506, some example methods may hydraulically fracture the geological formation to enhance its hydraulic connectivity and expose additional reactive surfaces. However, as noted previously, injection of a water-based stimulant into the rock formation may itself cause sufficient increases in porosity and permeability and hydraulic connectivity such that a precursor fracturing step may not be necessary. Either following operation 504 or optional operation 506, the procedure may then advance to operation 510, which is described below. In embodiments where an existing wellsite will be selected for use, the procedure may begin from operation 508 rather than from operation 502.

In operation 508, some example methods may begin the procedure by locating an existing well providing access to reactive surfaces of mafic or ultramafic rock. For instance, certain geothermal wells may be drilled into mafic or ultramafic formations, and may thereafter be suitable candidates for example embodiments described herein. Moreover, the same considerations involved in locating an appropriate rock formation for drilling of a wellbore may be used to identify existing wellbores that may be repurposed for hydrogen generation and/or carbon sequestration as discussed herein.

Following drilling (and possibly hydraulic fracturing) of a wellbore as described in operations 504 and 506, or simply locating a suitable existing wellbore as described in operation 508, the procedure may thereafter advance to operation 510 for the first of two artificially induced rock reaction stages. Optionally, prior to performance of operation 510, the wellbore may be evaluated to remove latent fluid present in the wellbore (e.g., gas, water, brine, drilling fluid, or the like).

As shown by operation 510, example methods involve the injection of a water-based stimulant into the pathway provided by the wellbore and into contact with reactive surfaces of the geological formation. Reaction of at least a portion of the water-based stimulant with one or more of the reactive surfaces of the geological formation generates hydrogen, in accordance with the serpentinization reactions described previously. Either following hydraulic stimulation or when utilizing natural fracture networks, the thermochemical activity and hence rates of the reaction may be enhanced by first removing fayalite by reacting the fayalite or ferrosilite with water at favorable conditions of temperature (60° C. to 260° C.), pressure (>1 atmosphere, but typically above 50 bars), gas chemical composition, pore water chemical composition (e.g., salinity), pH (>8.3, but commonly above 9.5), and in reducing conditions/low oxygen fugacity (i.e., negative Eh). When the fayalite and ferrosilite drop out of the solid solution due to reaction with water of optimized composition, the thermochemical activity of the remaining forsterite and enstatite, as well as antigorite, and/or brucite, and/or other mineral phases produced by carbonation reactions will increase according to their newly exposed surface area. Thus, the reactivity of the remaining forsterite and enstatite minerals will proceed at an increased rate (determined to be between 4 and 19% faster in laboratory simulations) according to the now higher molar fraction of this phase in the solid solution.

In many embodiments, the water-based stimulant may intentionally not include carbon dioxide. By injecting the water-based stimulant into the formation without the common-in-natural-setting co-reactions of carbon mineralization prompted by the presence of carbon dioxide, operation 510 creates more porosity and permeability in the rock formation itself, thereby enabling greater penetration of additional water for further hydrogen generation and eventually increasing the potential for increased carbon dioxide mineralization within the newly formed porosity (up to the theoretical limit of the Fe-silicate phase (e.g., up to ~20%). This enhancement is observed because the reaction of water with fayalite and ferrosilite in the mafic or ultramafic rock produces rock structures having volumetrically smaller crystalline structures. For instance, magnetite has a volumetrically smaller spinel crystal structure that is denser (5,170 $kg/m^3$) than that of the pre-reaction fayalite (4,390 $kg/m^3$) or ferrosilite (3,880 $kg/m^3$). Accordingly, the injection of the water-based stimulant in operation 510 spurs the reaction of fayalite and ferrosilite with water, which in turn reduces the volume of the reactive surfaces of the geological formation, increasing porosity and permeability, and hence the hydraulic connectivity in the subsurface regions proximate to the wellbore, thereby increasing the surface area available for subsequent reactions.

Moreover, this water-rock reaction differs from the naturally occurring reactions in the subsurface in several key ways. First, the water-based stimulant may include characteristics that do not occur in nature. For instance, the water-based stimulant may not comprise pure water, but may also include other components, such as hydrogen sulfide (0-30% by volume in the gas phase) or salts (e.g., Na, Ca, Cl, Br). Moreover, the water-based stimulant may have an oxygen fugacity with a negative Eh value (i.e., negative electric potential), a pH of between about 8.3 and about 11.1, across a range of salinity (0.1 to 4.5 per mil) sodium chloride (NaCl). This combination of characteristics rarely occurs naturally in situ and is challenging to sustain throughout the evolution of various geological processes. To produce water-based stimulant having low oxygen fugacity, the water may be sourced from groundwater, municipal wastewater, mine water, geothermal water, and/or other waste/process water streams which has a naturally low oxygen fugacity, or may be pre-processed to artificially induce a low oxygen fugacity (for instance, by passing the water-based stimulant through a heated bed of copper filings prior to injection into the well or otherwise electrically catalyzing the removal of oxygen). Moreover, the pH balance of the water-based stimulant may be modified through the addition of sodium bicarbonate or various hydroxides. Finally, the salinity of the water-based stimulant may be adjusted through the addition of sodium chloride, or other common salts (e.g., KCl).

At operation 512, a fluid composition including hydrogen, a mixture of hydrogen with nitrogen, a mixture of hydrogen with methane, and/or a mixture of hydrogen with carbon dioxide gas may thereafter be recovered from the wellbore. Importantly, the molecular and isotopic composition of hydrogen formed by in situ reactions can be determined and used to quantify the contributions from in situ hydrogen generation based on measurement of the in situ temperature conditions and comparison to standard geothermometers based on the known fractionation factors (a) between $H_2O$ and $H_2$. The fluid may spontaneously flow based on its own pressure or be pumped out of the well following operation 512, and may thereafter be stored for subsequent use, further processed and transmitted away from the wellsite, or even used as a fuel at the wellsite itself. While the generation of hydrogen has previously been described as a product of the interaction between injected water-based stimulant and the reactive surfaces of the mafic or ultramafic rock, other reactions may occur as well. For instance, depending on the fluid composition used during treatment, certain redox-sensitive components of the rock formation, such as lithium, nickel, molybdenum, cobalt, and rare earth elements (e.g., lanthanum, cerium) and uranium may be mobilized from the injection of water as described in operation 510. Because the disclosed two step fluid injection process involves changing redox (i.e., Eh, oxidizing to reducing shifts) and pH (acidic to basic shifts) conditions, various rare metals are solubilized and hence recoverable with flowback fluids from the well. The fluid composition recovered from the wellbore may also contain these mobilized components, which may thereafter be further separated from the fluid composition after extraction from the well. Separation can be conducted using density separation, membranes, or collection of gangue material.

Following operation 512, the procedure may return to operation 510 for another round of water-based stimulant injection. Alternatively, the procedure may advance to operation 514 as described below.

After the recovery of the fluid composition, operation 514 illustrates that example methods may utilize the subsequent injection of carbon dioxide into the pathway provided by the wellbore and into the geological formation. The carbon dioxide may be injected at a pressure exceeding atmospheric pressures up to (but below) the lithostatic pressure (considering various safety factors)) expected for the latent pressure within the target rock formation. Reaction of at least a portion of the carbon dioxide with one or more of the forsterite, enstatite, antigorite, or brucite in the geological formation will permanently mineralize carbon from the injected carbon dioxide into the solid (mineralized) form of magnesium carbonate, or other carbonate minerals. In various embodiments, the injected carbon dioxide may be a supercritical carbon dioxide, and/or a fluid mixture of carbon dioxide with water and other elements. For instance, the carbon dioxide mixture may also contain varying proportions of nitrogen ($N_2$, up to at least 50%) or other gases (e.g., helium (He, up to at least 1%), argon (Ar, up to at least 1%), dihydrogen sulfide ($H_2S$, up to at least 10%) of varying proportion. The carbon dioxide mixture may have a pH of between about 4.8 and about 6.5 and may have a salinity of (0.1 to 4.5 per mil) sodium chloride (NaCl).

Injection of carbon dioxide prompts mineralization within the rock formation, thereby reducing porosity, permeability, and hydraulic connectivity of the rock. Accordingly, because of the tendency of carbon mineralization to "plug" the rock formation, in some embodiments the step at operation 514 of injecting the carbon dioxide through the pathway provided by the wellbore may be conducted as part of a well stimulation process.

As described above, example embodiments provide methods and systems for in situ generation of hydrogen and permanent (mineralized) sequestration of carbon dioxide.

FIG. 5 illustrates operations performed in various example embodiments. It will be understood that each flowchart block, and each combination of flowchart blocks, may be implemented by various means. The flowchart blocks support combinations of means for performing the specified functions and combinations of operations for performing the specified functions. In some embodiments, some of the operations above may be modified or further amplified. Furthermore, in some embodiments, additional optional operations may be included. Modifications, amplifications, or additions to the operations above may be performed in any order and in any combination.

Laboratory Experiments

In a simulated implementation of a system and a method of an embodiment of the disclosure, an ultramafic ore was reacted with carbon dioxide to sequester the carbon dioxide as magnesium carbonate and water to evolve hydrogen gas. The example was conducted in three phases: 1) rock preparation; 2) water preparation; and 3) reaction process, each of which is described in greater detail below. As part of the analysis of the overall system and method, the composition of the ore (i.e., forsterite, fayalite, and other minerals), the reaction conditions to which the ore was subjected, and the characteristics of the carbonation/serpentinization reaction products were assessed. For instance, with respect to the ore composition, the mass, mineralogy, and geochemical composition of the bulk rock were determined by x-ray powder diffraction (XRD) to evaluate the abundance of relevant constituents (e.g., fayalite, ferrosilite, FeO, MgO, and CaO).

In the rock preparation phase, an ultramafic aggregate material that included mostly lightly crushed rock of approximately 1.0 cm in size were collected from four active quarries (namely, two quarries in Pennsylvania, one in Virginia, and one in Kentucky). The ultramafic aggregate material was disaggregated (i.e., lightly crushed/comminuted) initially with a rock hammer and then with a Spex Ball mill. The powdered material was then sieved using grates arranged and designed to pass 150- and then 80-micron grains. This enabled experimentation to be conducted on at least two different grains sizes. Another material—a homogenized olivine mineral—was also purchased from a scientific supplier in California. This olivine material, which was homogenized for size and composition, had a uniform particle size of approximately 100 microns.

In the water preparation phase, two preparations were made. First, a low oxygen fugacity, high pH water was obtained by adding sodium bicarbonate to tap water in order to adjust the pH of the water to be between about 8.5 and about 11.1. As understood by those skilled in the art, oxygen fugacity ($fO_2$) is a measure of the amount of oxygen available to react with elements having multiple valence states—such as iron and carbon. A high oxygen fugacity is indicative of a high chemical potential of oxygen in the water. A lowered oxygen fugacity of water can be achieved in a variety of manners (e.g., by the use of low oxygen fugacity water supply such as municipal wastewater, groundwater, mine water, or other wastewater stream). One method for simply and reliably generating low oxygen fugacity water utilizes a heated bed of copper filings at 125° C. through which the water is passed. In another method, a saline water was obtained by adding salt (sodium chloride) to tap water to create saline solutions ranging from 0.09 to 1.5%. In preparation for carbon mineralization experiments, the pH of the saline water was adjusted to be between about 4.8 and about 6 using dilute HCl in a mixture of distilled water and a sodium acetate buffer.

For the reaction process, a batch reactor was designed and built to conduct the carbonation and serpentinization reactions in both batch and sequential configurations. All of the reactions were performed in this closed stainless steel reaction vessel as a "batch" reaction (i.e., closed system). For each experiment, whole samples (approximately 250 grams) were selected and sliced into two equally sliced approximately 125 grams of raw material were placed in the gas-tight, stainless steel reaction vessels. In preparation for the introduction of water injection to the vessel, low oxygen fugacity water with high pH (8.3-11.1 obtained from using tap water plus sodium bicarbonate) and saline water (obtained by adding NaCl to a concentration of 0.1 to 4.5 per mil). A heated bed of copper filings at 125° C. was utilized in our experimental setup to reduce oxygen fugacity. Separately for the $CO_2$ introduction stage, tap water was lightly acidified using dilute HCl in a mixture of distilled water and a sodium acetate buffer, mixed to 0.1 to 4.5 per mil NaCl at ambient oxygen fugacity and sprayed onto powdered rock to provide a wet surface (known to enhance $CO_2$ reactivity) for reactions.

In the first reaction phase, hydrogen generation was targeted. Before the introduction of water with low oxygen fugacity, the reactor was evacuated using a mechanical rough pump to remove ambient oxygen. Next, water was introduced at room temperature and ambient atmospheric pressure. Initial pressure was recorded. Temperatures were increased to 60, 100, 150, 200, 250, 300, and 400° C. with the temperature being controlled by an external band heater and measured with an Omega K-wire thermocouple. At each step, gas phase pressure was measured on a sampling port by monitoring with a standard Omega 0 to 100 psi pressure gauge and an aliquot of gas measured using a Stanford Research Systems residual gas analyzer ("quadrupole mass spectrometer") and SRI gas chromatograph fitted with a thermocouple detector. The total pressure of hydrogen was calculated by determining the product of the percentage of hydrogen gas measured using the residual gas analyzer and/or gas chromatograph with the pressure compared to atmospheric pressure and assuming PV=nRT. The preliminary results indicated that the hydrogen kinetic rates (~1.3 times) and total volume (1.8 times more at a given temperature and composition) of hydrogen at thermodynamic equilibrium are improved by decreasing the grain size from 150 to 80 microns.

A second sequence of experiments focused on carbon sequestration in the pursuit of carbon neutral to carbon negative hydrogen. In this setup, the initial focus was on powdered rock and then the process was stepped up to utilize whole rock core plug samples. In both cases, the materials were sprayed with water and placed into a stainless-steel reaction vessel and conducted as a "batch" reaction. Before the introduction of water, the reactor was evacuated using a mechanical rough pump to remove ambient oxygen; later experiments demonstrated that the presence of oxygen is not material to this reaction. Next, carbon dioxide (UHP $CO_2$ and separately 4:1 $CO_2$ mixed with $N_2$) was introduced at room temperature and at an initial pressure of 2 atmospheres (above atmospheric pressure). Next, the temperatures were increased to 100, 150, 200, 250, 300, and 400° C. (controlled by an external band heater and measured with thermocouple). At each step, gas phase pressure was measured at a sampling port by monitoring with a standard Omega 0 to 100 psi pressure gauge and an aliquot of gas measured using a Stanford Research Systems residual gas analyzer ("quadrupole mass spectrometer") and SRI gas chromatograph fitted with a thermocouple detector. The total pressure of hydrogen was calculated by determining the product of the percentage of hydrogen gas measured using the residual gas analyzer and/or gas chromatograph with the pressure compared to atmospheric pressure and assuming PV=nRT. As a next step in this process, pressure was increased to 5, 10, 25, and 50 bars of $CO_2$ measured using on-tank $CO_2$ pressure gauges. In the subsurface, significantly higher pressures can be achieved, but were not feasible in our current experimental setup; increased pressures would enhance the rate of the reaction. At each step, the gas phase pressure was measured on a sampling port attached to an expansion volume to reduce pressure and monitored using a standard Omega 0 to 100 psi pressure gauge and an aliquot of gas measured using a Stanford Research Systems residual gas analyzer ("quadrupole mass spectrometer") and SRI gas chromatograph fitted with a thermocouple detector. The total pressure of hydrogen was calculated by determining the product of the percentage of hydrogen gas measured using the residual gas analyzer and/or gas chromatograph with the pressure compared to atmospheric pressure and assuming PV=nRT. $CO_2$ sequestration kinetics also improved with smaller grain sizes (~1.8 times). The same systematic experimental design will utilize super-critical $CO_2$. Following the experiments, the pieces of each sample (both first and second) were compared under optical microscopy to identify mineralization and evaluate porosity.

Following the hydrogen generation experiments, magnetite, brucite, and serpentine and the "pre-concentration" of an Mg-rich Mg-silica phase in the whole rock was identified. The new material was subjected to the optimized carbon sequestration experimental design. At each temperature step the pressure from the injected $CO_2$ decreased more significantly indicating faster kinetic rates of $CO_2$ sequestration (3.6 times faster decrease was observed between 50 and 400° C. over the course of 18 hours in the batch experiment. Following the experiments, the pieces of each sample (both first and second) were compared under optical microscopy to identify mineralization and evaluate porosity. The kinetic rates of reactions improve (~1.4 times) as hydrogen generation and $CO_2$-driven comminution helped facilitate the further breakdown of the rock.

Following the sequential reactions, the mass, mineralogy, and geochemical composition of the bulk rock were determined by XRD to evaluate the abundance of relevant constituents (e.g., fayalite, ferrosilite, FeO, MgO, CaO). It was observed that the abundance of magnesite and calcite were significantly (1.4 times) higher in the sequential reaction than when the reaction was done without first initiating hydrogen generation. Prior to initiation of the experiment, the first piece was evaluated using optical microscopy to identify mineral distribution, fractures, and pore space and compared to samples following treatment. The first piece of each sample was placed into the reaction chamber in gas-tight, stainless steel reaction vessels. The second piece of each sample was used as a control for comparison.

Green (Carbon Negative) Hydrogen

As noted previously, sequestration of the carbon in the carbon dioxide was targeted through carbonation reactions. The formation of magnesite (magnesium carbonate) and calcite (calcium carbonate) by "water-rock" serpentinization reactions using injected $CO_2$ and water into mafic or ultramafic rock (in situ) provides an economic, scalable, and permanent (i.e., mineralized) form of carbon sequestration. The invention of carbon sequestration associated with in situ engineered hydrogen generation is a two stage process that includes: 1) first, the removal of the Fe-rich Fe-silicate (or potentially Fe-sulfide) phases through in situ engineered hydrogen generation utilizing serpentinization reactions under optimized conditions, thereby increasing the thermochemical driver for carbonation reactions; 2) the mixture and injection of water and $CO_2$ under optimized conditions (pH of 4.4-6 under atmospheric (oxidizing) conditions) to chemically break down the Mg-rich and Ca-Rich silicate portions of mafic and ultramafic rocks at temperatures of 100-400° C. at a pressure in excess of ~50 bars to produce magnesite (magnesium carbonate) and calcite (calcium carbonate). This process is done sequentially in optimized conditions that enable, and enhance, the production of magnesite and calcite while minimizing the formation of accessory/competitive phases and following the formation of enhanced porosity, permeability, and fracture intensity achieved by the sequential reaction.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of producing hydrogen gas from a geological formation comprising mafic igneous rock, ultramafic igneous rock, or a combination thereof, the method comprising:

providing a wellbore that at least partially traverses the geological formation, the wellbore providing a pathway for injection of fluids into the geological formation and recovery of fluids therefrom, wherein the geological formation includes iron-rich rock;

injecting a water-based stimulant through the pathway provided by the wellbore and into contact with reactive surfaces of the geological formation to generate a hydrogen gas via serpentinization; and recovering a fluid composition comprising the hydrogen gas from the wellbore via the pathway.

2. The method of claim 1, further comprising:

hydraulically fracturing the geological formation by pumping the water-based stimulant through the wellbore and into the geological formation.

3. The method of claim 1, wherein the water-based stimulant is substantially free of carbon dioxide.

4. The method of claim 1, wherein the water-based stimulant has a salinity of about 0.1 to 4.5 per mil sodium chloride.

5. The method of claim 1, wherein the water-based stimulant that is injected into the pathway has a pH of between about 8.3 and about 11.1;

wherein pressure proximate to the reactive surfaces of the geological formation is in excess of about one atmosphere and below a lithostatic pressure of the geological formation; or wherein the reactive surfaces of the geological formation have a temperature of between about 60° C. and about 260° C.

6. The method of claim 1, wherein the reactive surfaces of the geological formation comprise one or more of fayalite, ferrosilite, or a combination thereof.

7. The method of claim 1, wherein the fluid composition recovered from the wellbore further comprises one or more redox-sensitive components from the geological formation, and wherein the method further comprises separating the one or more redox-sensitive components from the fluid composition recovered from the wellbore.

8. The method of claim 1, wherein the water-based stimulant is configured to cause fractures in the geological formation.

9. The method of claim 1, further comprising:

after the fluid composition is recovered, injecting carbon dioxide through the pathway provided by the wellbore and into the geological formation, wherein reaction of at least a portion of the carbon dioxide with one or more of mafic or ultramafic rocks in the geological formation generates at least magnesium carbonate or calcium carbonate.

10. The method of claim 9, wherein injecting the carbon dioxide through the pathway provided by the wellbore comprises injecting a mixture of water and carbon dioxide through the pathway provided by the wellbore and into the geological formation.

11. The method of claim 10, wherein the mixture of water and carbon dioxide has a pH of between about 4.8 and about 6.5, wherein the mixture of water and carbon dioxide has a salinity of between 0.1 to 4.5 per mil sodium chloride, wherein the mixture of water and carbon dioxide contains nitrogen, dihydrogen sulfide, methane, or other trace gases, wherein the carbon dioxide is injected into the geological formation at a pressure of between one bar and a lithostatic pressure of the geological formation, or wherein the carbon dioxide that is injected into the geological formation comprises supercritical carbon dioxide or a mixture of supercritical carbon dioxide and other fluids.

12. The method of claim 1, wherein the water-based stimulant includes dihydrogen sulfide.

13. The method of claim 12, wherein the water-based stimulant comprises up to about 30% by volume of dihydrogen sulfide.

* * * * *